Nov. 18, 1958  B. H. MOSBACHER  2,860,895
SHAFT SEAL CONSTRUCTION
Filed Nov. 1, 1954  2 Sheets-Sheet 1
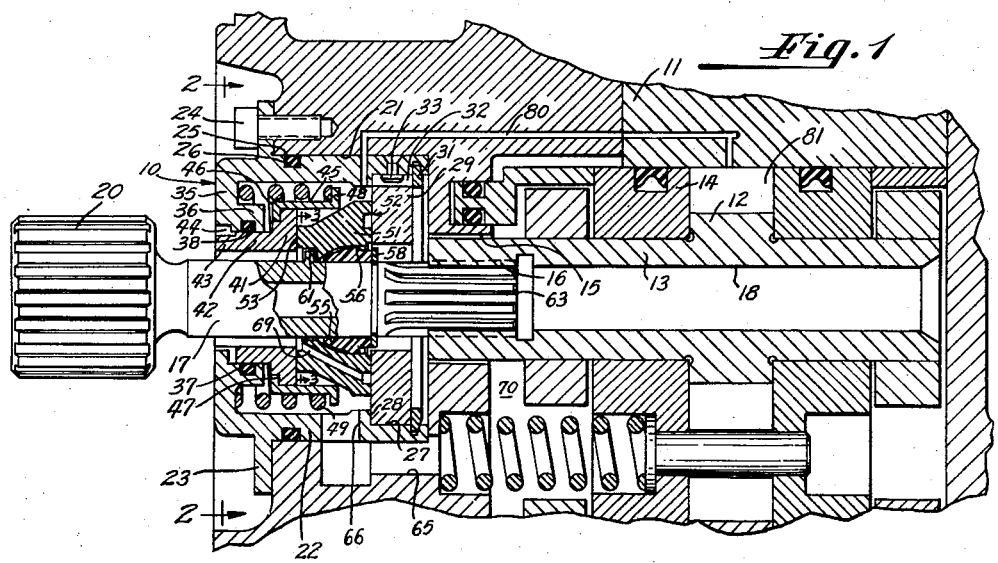
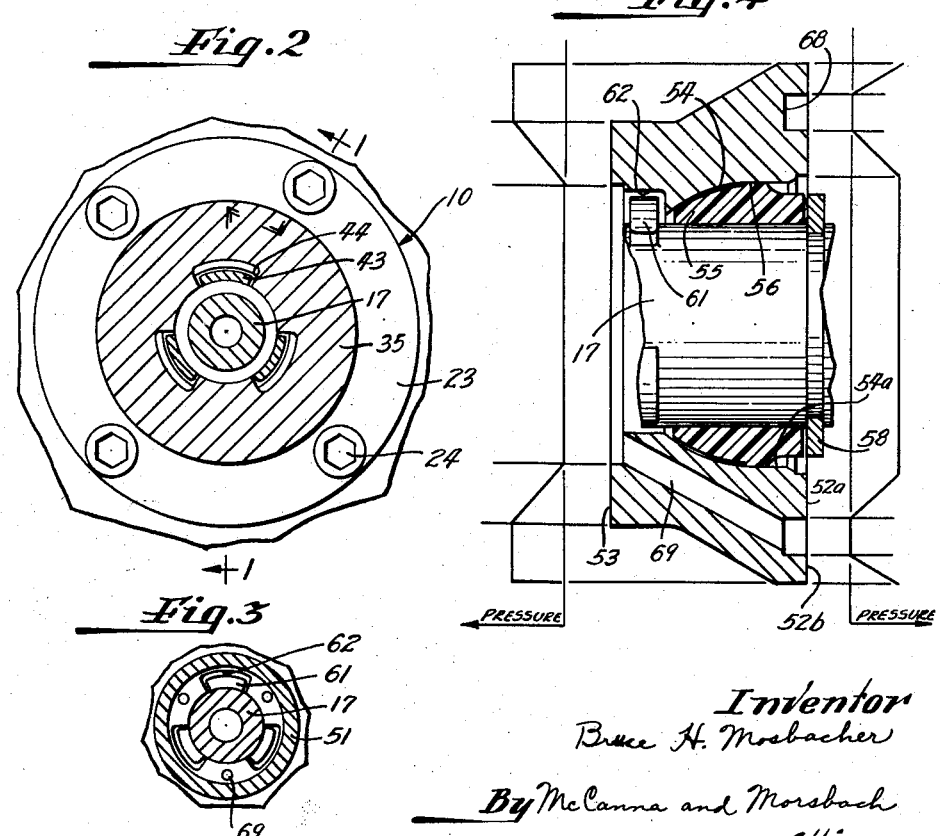
Inventor
Bruce H. Mosbacher
By McCanna and Morsbach
Attys.

Nov. 18, 1958 B. H. MOSBACHER 2,860,895
SHAFT SEAL CONSTRUCTION
Filed Nov. 1, 1954 2 Sheets-Sheet 2
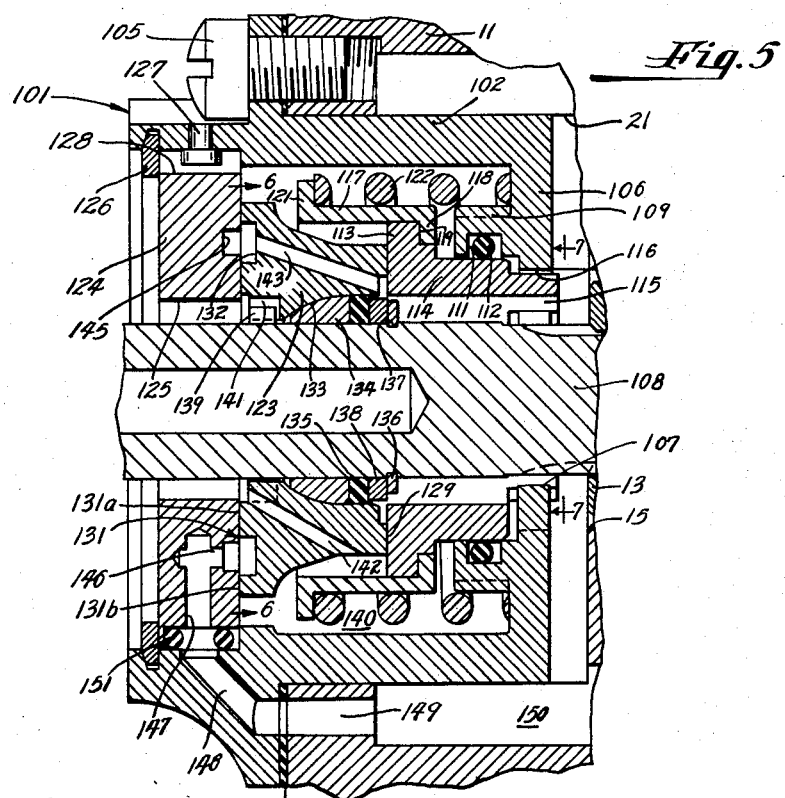
Fig. 5
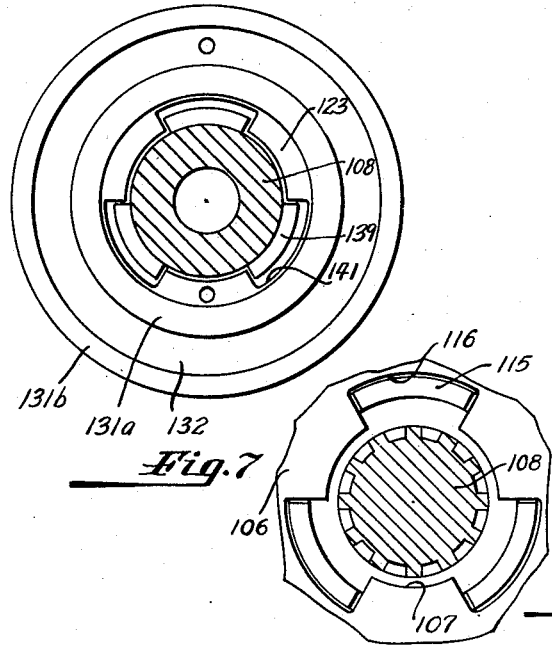
Fig. 6
Fig. 7
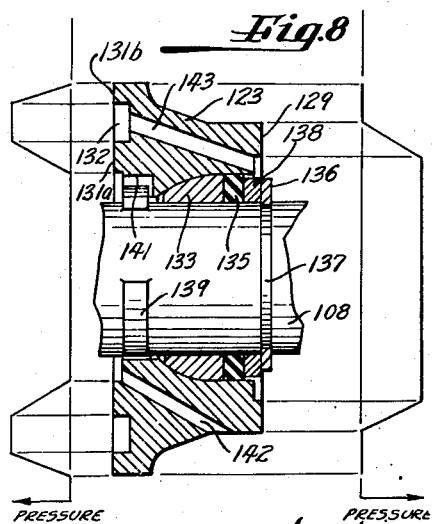
Fig. 8
Inventor
Bruce H. Mosbacher
By McCanna and Morsbach
Attys.

United States Patent Office 2,860,895
Patented Nov. 18, 1958

2,860,895
SHAFT SEAL CONSTRUCTION
Bruce H. Mosbacher, Rockford, Ill., assignor to Roper Industries Inc., Rockford, Ill., a corporation of Illinois
Application November 1, 1954, Serial No. 465,968
14 Claims. (Cl. 286—8)

This invention comprises novel and useful improvements in shaft seals.

An important object of this invention is to hydraulically balance the drive shaft of an hydraulic apparatus wherein the drive shaft extends into the apparatus from externally thereof and the inner end of the drive shaft is subjected to the hydraulic pressure within the apparatus.

Another object of this invention is the provision of a shaft seal construction in which fluid under pressure is applied to the rotatable member of the shaft seal in such a manner as to produce an hydraulic thrust on the rotatable seal member which is substantially equal to and opposite the end thrust on the drive shaft due to the pressure differential on opposite ends of the drive shaft and in which the rotatable seal member is operatively connected to the drive shaft to thereby counteract the end thrust thereon.

A further object of this invention is to provide a novel shaft and shaft seal sub-assembly wherein the drive shaft, the rotary shaft seal member and the stationary shaft seal members are contained within a separate housing which is removable as a unit from the hydraulic apparatus to thereby facilitate assembly and repair of the shaft seal.

Still another object of this invention is the provision of an improved shaft seal and drive shaft assembly for an hydraulic apparatus in which the shaft seal is arranged to accommodate considerable misalignment between the drive pad and the driven element in the hydraulic apparatus.

Yet another object of this invention is the provision of a shaft and shaft seal assembly in which the rotary seal member is floatingly mounted on the shaft so that the rotary seal member is free to align its seal face with that of the stationary seal member.

Yet another object of this invention is the provision of a shaft seal assembly including a rotary seal member and a pair of stationary seal members on opposite sides of the rotary seal member which form separate areas on opposite sides of the rotary seal member to which different fluid pressures may be applied to counterbalance the end thrust on the drive shaft.

An additional object of this invention is the provision of a cooling system for the shaft seal to thereby permit operation of the seal at high speeds.

These, together with various ancillary objects and advantages of this invention will be more readily appreciated as the same becomes better understood by reference to the following detailed description when taken in connection with the accompanying drawings wherein:

Figure 1 is a fragmentary sectional view through an hydraulic pump having the improved shaft seal assembly mounted thereon, taken on the plane 1—1 of Fig. 2;

Fig. 2 is a fragmentary sectional view taken on the plane 2—2 of Fig. 1;

Fig. 3 is a fragmentary sectional view taken on the plane 3—3 of Fig. 1;

Fig. 4 is a diagrammatic illustration of the pressure distribution across opposed faces of the rotary seal member shown in Fig. 1;

Fig. 5 is a fragmentary longitudinal sectional view of a modified form of seal assembly;

Fig. 6 is a fragmentary transverse sectional view taken on the plane 6—6 of Fig. 5;

Fig. 7 is a fragmentary transverse sectional view taken on the plane 7—7 of Fig. 5; and Fig. 8 is a diagrammatic illustration of the pressure distribution across opposed faces of the rotary seal member shown in Fig. 5.

The shaft seal assembly is adapted for use with any type of hydraulic apparatus wherein a shaft extends into the housing from externally thereof and is exposed at its inner end to the hydraulic pressure within the housing. The pressure differential on opposite ends of the shaft produces an end thrust thereon and the seal assembly of the present invention is arranged to hydraulically counterbalance this end thrust.

As shown in the accompanying drawings, the shaft seal assembly, indicated generally by the numeral 10, is mounted on a pump of the gear type which includes a multi-section housing 11 having a plurality of gears 12 disposed in the pump chambers thereat with the trunnions 13 of the gears rotatably supported on the housing by blocks 14. The pump may be of any suitable construction and is here illustrated as a pump of the 4-gear type in which each of the gears 12 mesh with a pair of adjacent gears. One of the gear trunnions 13 extends through an opening 15 in the pump housing 11 and is provided with an internally splined end 16 by means of which the trunnion or driven element is drivingly connected to the drive shaft 17. Conveniently, the trunnion 13 may be provided with an axially extending passage 18 which extends therethrough whereby the fluid pressure acting on opposite ends of the trunnion are equalized to effect hydraulic balance of the pump gear and trunnions.

The pump housing 11 is formed with an enlarged annular recess 21 in one end thereof which communicates with the passage 15 in the pump housing and which recess is arranged to receive the shaft seal assembly 10.

In general, the seal assembly comprises a rotary seal member coupled to the shaft to receive the end thrust thereon and an arrangement including a pair of non-rotatable or stationary seal members which form a running seal with opposite ends of the rotary seal member and provide separate areas on opposite sides of the rotary seal member to which different hydraulic pressures may be applied to counterbalance the end thrust on the shaft. The rotary seal member is floatingly supported on its shaft to accommodate misalignment and wobble of the drive shaft and at least one of the stationary seal members is floatingly supported to assure a proper seal with the adjacent end of the rotary seal member.

In the embodiment illustrated in Figs. 1—4, the seal assembly 10 comprises an annular casing 22 which is disposed in the recess 21 in the pump housing and has an outwardly extending peripheral flange 23 adapted to be attached as by fasteners 24 to the pump housing 11. A peripheral groove 25 is formed in the outer periphery of the seal casing and a resilient O-ring 26 is disposed in the groove to form a seal thereat. Alternatively, the seal casing may be formed integrally with the pump housing, if desired. The inner end of the seal casing 22 has an internal recess 27 formed thereat which provides a shoulder 28 against which the annular stationary seal member 29 abuts, the latter being retained in the recess 27 by a split ring 31 carried by the seal housing. The stationary seal member 29, hereinafter referred to as the inner stationary member, has a notch 32 formed in the periphery thereof which is adapted to receive the inwardly extending key 33 carried by the seal housing whereby the inner stationary seal member is non-rotatably supported on the seal housing.

An inwardly extending rim 35 is formed on the outer end of the seal housing and carries a re-entrant sleeve 36 which has an annular inwardly opening groove 37 formed therein for the reception of an O-ring 38. An outer seal member 41, including an integral axially extending sleeve 42, is floatingly supported by the O-ring 38 for axial sliding and tilting movement. The outer seal member 41 is also non-rotatably connected to the housing and for this purpose the end of the sleeve 42 is provided with a plurality of annularly spaced axially extending splints 43 which loosely extend into complementary annularly spaced notches 44 formed in the inwardly extending rim 35 on the seal housing. A cylindrical spring retainer 45 is mounted on the periphery of the outer stationary seal member 41 and has an inwardly directed flange 46 received in a complementary groove 47 in the seal member, an outwardly extending flange 48 being formed on the other end of the retainer for engagement by one end of the spring 49.

A rotary seal member 51 is disposed within the seal housing between the inner and outer stationary seal members and has an inner seal face 52 engaging the inner stationary seal member 29 and outer seal face 53 engaging the outer seal member 41. The rotary seal member is formed with an axially disposed semi-spherical socket 54, the center of which socket is located intermediate the inner and outer seal faces 52 and 53 respectively. For convenience in assembly, the socket 54 flares into a cylinder 54a adjacent the inner seal face 52. A semi-spherical ball member 55 is disposed on the drive shaft 17 and floatingly supports the rotary seal member thereon so that the rotary seal member is free to align its inner seal face with the inner stationary seal member. Conveniently, the ball member may be formed of a plastic material such as "Teflon" or the like which is adapted to support the rotary seal member on the shaft and seal the interface therebetween. An annular rib 56 is formed on the periphery of the ball member of a diameter adapted to be press fitted into the socket 54 to thereby assure a proper seal thereat. A split ring 58 is provided on the shaft 17 and engages the inner end of the ball member 55 to apply the end thrust on the shaft, due to the hydraulic pressure acting on the inner end thereof, to the ball member which is, in turn, coupled by the ball and socket arrangement to the rotary seal member. A positive drive between the rotary seal member and the drive shaft is effected by the annularly spaced outwardly extending segments 61 formed on the drive shaft and which loosely extend into complementary annularly spaced notches 62 formed in the rotary seal member. The inner end of the drive shaft 17 is externally splined as indicated at 63 and is loosely received in the internally splined end 16 of the driven element of trunnion 13 to thereby drivingly connect the drive shaft to the driven element 13.

The fluid which leaks past the several pump elements from the pump chambers fills the cavity 70 within the pump housing 11 with fluid at an intermediate pressure, usually less than the pump discharge pressure. Fluid at this intermediate pressure passes through the passage 15 in the pump housing and between the splines on the drive shaft 63 and the driven element 13 so that the fluid pressures acting upon opposite ends of the driven element are substantially equal and the latter is hydraulically balanced. This fluid pressure also acts upon the inner end of the drive shaft and tends to urge the latter outwardly of the pump housing. In order to counterbalance the end thrust on the drive shaft, due to the pressure unbalance on opposite ends thereof, fluid under the intermediate pressure is applied to an area on the side of the rotary seal member opposed to the inner end of the drive shaft. In the form of the shaft seal illustrated in Figs. 1-4, fluid under intermediate pressure is applied through the passage 65 in the pump housing and through an opening 66 in the seal casing to the rotary seal member between the inner and outer stationary seal members. The rotary seal member is formed so that the hydraulic pressure applied thereto produces a pressure unbalance on the rotary seal member which is substantially equal to and opposite the end thrust on the drive shaft produced by the pressure unbalance on opposite ends of the drive shaft. Since the end thrust on the drive shaft is applied to the rotary seal member through collar 58, it is apparent that the sub-assembly of the rotary seal member and drive shaft is substantially hydraulically balanced.

Thus, fluid at the intermediate hydraulic pressure and fluid at the pressure externally of the pump housing, hereinafter referred to as atmospheric pressure, are applied to selected areas on both the inner and outer sides of the rotary seal member, and it is necessary to properly proportion the respective areas on opposite sides of the rotary seal member which are exposed to intermediate pressure and atmospheric pressure to obtain the desired pressure unbalance thereon. This is achieved in the embodiment of the shaft seal illustrated in Figs. 1-4, by locating the outer seal face 53 radially inwardly from the outer periphery of the inner seal face 52 to provide an annular area on the outer side of the rotary seal member which is exposed to the intermediate pressure, and by providing an annular groove 68 in the inner seal face which separates the inner seal face into concentric seal areas 52a and 52b. The groove 68 is communicated with the atmosphere externally of the pump housing through a passage or passages 69 in the rotary seal member so that a reduced pressure is applied over a portion of the area on the inner side of the rotary seal member.

Since the drive shaft is connected to the rotary seal member, and as both the inner end of the drive shaft and the inner side of the rotary seal member inside of the inner periphery of the inner seal face 52 are exposed to intermediate hydraulic pressure, an area equal to the circle within the inner seal face 52 can be considered as having full intermediate pressure applied thereto. The pressure, however, along each of the several seal faces varies from a maximum at the edge of the seal face adjacent the high pressure to a minimum at the edge of the seal face adjacent the low pressure. Consequently, the pressure distribution will vary across the diameter of the rotary seal member.

As shown diagrammatically in Fig. 4, full intermediate pressure is applied across the area inside the inner seal face 52, the pressure decreasing in a radial direction across the seal area 52b from intermediate pressure at the inner edge of the inner seal face to zero or atmospheric pressure at the groove 68, the pressure then increasing across the seal area 52a from zero at the groove edge to full intermediate pressure at the outer periphery of the inner seal face. Similarly, the pressure varies across the outer side of the seal member, the pressure being zero or atmospheric across the area inside the outer seal face 53 and increasing in a radial direction across the outer seal face to full intermediate pressure at the outer periphery thereof, full intermediate pressure being applied across the area between the outer periphery of the outer seal face and the outer periphery of the inner seal face. To obtain hydraulic balance of the shaft 17 and rotary shaft seal member 51, the sum of the products of the pressure and the respective areas over which the pressures are applied on the inner side of the shaft and rotary seal member, diagrammaticaly illustrated at the right in Fig. 4, is made equal to the sum of the products of the pressures and the respective areas over which the pressures are applied over the outer side of the shaft and shaft seal, illustrated at the left of the shaft seal in Fig. 4.

The stationary seal member which is floatingly supported on the seal casing is also hydraulically balanced and for this purpose the outer periphery of the sleeve 42 on the outer seal member 41 is spaced inwardly from the outer periphery of the annular seal face 53 on the rotary seal member a distance such that when full intermediate pressure acts across this difference area between the outer periphery of the sleeve and the outer periphery of the outer seal face, it produces an hydraulic thrust which is substantially equal and opposite to the hydraulic thrust produced by the pressure gradient acting across the area of the outer seal member which contacts the outer seal face. Consequently, only the spring 49 applies pressure to the outer stationary seal member to effect seating of that member against the outer seal face 53 of the rotary seal member and the latter is, in turn, urged by this spring into seating engagement with the inner stationary seal member 29. Preferably, the area of the outer seal face 53 is of the same order of magnitude as the area of the inner seal face 52 so that the sealing pressures applied thereto by the spring 49 are substantially equal.

In order to permit operation of the shaft seal at high speeds without excessive heating, provision is made for cooling the seal assembly. In the form of shaft seal illustrated in Figs. 1–4, the chamber around the rotary seal is filled with fluid at an intermediate pressure, which fluid, as previously described, leaks from the pump chambers into the chamber 70 and through passages 65 and 66 into the seal casing. A portion of the fluid which leaks from the pump chambers may be circulated through the seal casing to effect cooling of the several parts thereof. This is achieved by the provision of a by-pass passage 80 in the pump housing and seal casing which by-pass communicates the latter with an inlet passage 81 in the pump.

A modified form of the invention is illustrated in Figs. 5–8 inclusive. As in the preceding embodiment, the shaft seal assembly 101 is disposed within a seal casing 102 which is removably received in the recess 21 in the pump housing 11. The seal casing is sealed to the pump housing by means of a gasket 104 and secured in position thereon by fasteners 105. Alternatively, the seal casing 102 may be formed integrally with the pump housing 11, if desired. The inner end of the seal casing 102 has a wall 106 thereon and a central opening 107 through which a shaft 108 extends. A re-entrant sleeve 109 is formed on the end wall 106 and has an annular inwardly opening groove 111 formed therein for the reception of the O-ring 112. An inner stationary seal member 113 having an axially extending sleeve 114 is floatingly supported on the O-ring 112 and is non-rotatably connected to the seal casing 102. For this purpose, the sleeve 114 is provided with a plurality of axially extending splints 115 which extend into corresponding notches 116 in the end wall 106 of the seal casing. A cylindrical spring retainer 117 is disposed on the periphery of the inner stationary seal member 113 and has an inwardly directed flange 118 received in a complementary groove 119 in the inner seal member, and an outwardly directed flange 121 at the opposite end thereof. A compression spring 122 is interposed between the flange 121 and the end wall 106 of the seal casing to yieldably urge the inner stationary seal member into engagement with the rotary seal member 123.

An outer stationary seal member 124, having an opening 125 therein through which the shaft 108 extends, is disposed at the end of the housing remote from the end wall 106 and is retained in position therein by a split ring 126. The outer stationary seal member is also locked against rotation and for this purpose a pin 127 is provided in the seal casing and extends into a notch 128 in the outer stationary seal member.

The rotary seal member 123 is mounted on the shaft 108 between the inner and outer stationary seal members and has an inner seal face 129 which forms a running seal with the inner stationary seal member 113, and an outer seal face 131 which forms a running seal with the outer seal member 124. The outer seal face 131 is formed with a groove 132 therein which separates the seal face into inner and outer concentric seal areas 131a and 131b respectively. The rotary seal member is formed with a semi-spherical socket 133 having a center located between the inner and outer seal faces, which socket opens at one end of the rotary seal member to facilitate assembly of the parts. A complementary semi-spherical ball member 134 is disposed on the shaft to floatingly support the rotary seal member on the shaft and permit the latter to align its outer seal faces with the outer stationary seal member. In the form of the invention illustrated in Figs. 5–8, the ball member 134 is formed of a suitable bearing material such as bronze and an annular resilient gasket 135 is disposed at one end of the ball member to seal the interface between the ball member and the shaft. As in the preceding embodiment, the end thrust on the shaft, due to the pressure unbalance between the inner and outer ends thereof, is applied to the rotary seal member. For this purpose there is provided a split ring 136 which is received in a groove 137 in the shaft and engages a collar 138 which abuts against the resilient gasket member 135 to thereby apply the end thrust on the shaft 108 to the rotary seal member. In the arrangement of the apparatus illustrated in the drawings, the pressure within the hydraulic apparatus is above the pressure outside of the pump housing 11 and consequently the end thrust on the shaft 108 tends to urge the latter outwardly of the housing. The ball and socket arrangement is such as to apply this end thrust to the rotary seal. Obviously, if the pressure within the pump housing 11 were below the pressure externally of the housing, as occurs in vacuum pumps, the socket 133 and ball 134 would be reversed so as to properly transmit the end thrust on the shaft to the rotary seal member. In order to prevent slippage between the shaft and the rotary seal, the shaft is provided with keys 139 which are loosely received in corresponding notches 141 in the rotary seal member to thereby positively drive the latter.

In the embodiment of Figs. 5–8, the inner seal face 129 is disposed radially inwardly of the seal areas 131b on the outer seal face and the chamber formed between the inner and outer stationary seal members is communicated with the atmosphere externally of the housing 11 through passage 142 in the rotary seal member. Fluid under pressure from within the housing 11 is applied to the annular groove 132, through passage 143.

The pressure distribution across opposite sides of the assembly of the rotary seal member and the drive shaft is shown graphically in Fig. 8. As is apparent from that drawing, the pressure on the outer side of the assembly, shown to the left in Fig. 8, is equal to atmospheric pressure across the area within the inner periphery of the seal area 131a, and increases in a radial direction across the seal area 131a to the intermediate fluid pressure within the housing which is applied to the groove 132 through passage 143 in the rotary seal member. The pressure decreases in a radial direction across the seal area 131b to atmospheric pressure at the outer edge of the seal area 131b. The pressure distribution across the inner side of the rotary seal member is shown to the right of the rotary seal member in Fig. 8. As shown, full intermediate pressure is applied across the area within the inner periphery of the inner seal face 129, which area includes the cross sectional area of the inner end of the shaft 108. The pressure decreases in a radial direction across the inner seal face 129 to atmospheric pressure at the outer periphery of the inner seal face and atmospheric pressure is applied to the area between the outer periphery of the outer seal member and the outer periphery of the inner seal face 129. As in the preceding embodiment, the areas on opposite sides of the rotary seal member are so proportioned that the total hydraulic thrust acting on the outer side of the rotary seal member and the outer end of the drive shaft 108 equals the total hydraulic thrust acting on the inner side of the rotary seal member and the inner end of the shaft 108 whereby the subassembly of the rotary seal member and the shaft 108 are substantially hydraulically balanced. The floating stationary seal is also hydraulically balanced, and for this purpose the outer diameter of the sleeve 114 of the inner stationary seal member is spaced radially inwardly from the outer periphery of the inner seal face 129. Consequently, a substantially constant pressure is applied against the floating inner seal member 113 to urge the latter against the inner seal face 129 on the rotary seal member and also urge the rotary seal member against the outer stationary seal member 124, which pressure is determined by the spring 122 and remains substantially constant notwithstanding variations in pressure within the housing 11.

In normal operation when the seal faces 129 and 131 form a running seal with the inner and outer stationary seal members, the pressure within the pump housing will be transmitted through the passage 143 to the annular groove 132 to effect the aforementioned hydraulic balance of the rotary seal member and shaft 108. However, if the pressure within the pump housing 11 is suddenly reduced, the hydraulic impedance of the passage 143 prevents the pressure within the groove 132 from reducing at the same rate and consequently there would be a tendency for the rotary seal member to be urged away from the outer stationary seal member 124. Fluid from within the housing could then flow through passage 143 past the seal area 131a to atmosphere and past the seal area 131b to the low pressure chamber 140 from where the fluid would flow through passage 142 to the atmosphere. However, the hydraulic impedance of the passage 143 would prevent rapid flow therethrough so that the pressure in the annular groove 132 and across the outer seal face 131 would be less than the pressure within the housing 11. This would produce a pressure unbalance on the rotary seal and shaft assembly which would tend to urge the rotary seal member back into sealing relation with the outer seal member 124. Further, the fluid which flows past the seal area 131b into the chamber 140 could not flow rapidly through the restricted passage 142 so that the pressure in the chamber 140 would be increased above atmospheric pressure and this would also produce a hydraulic thrust on the rotary seal member in a direction to urge the rotary seal member into sealing engagement with the stationary seal member 124. In this manner, the seal assembly illustrated in Figs. 5–8 will automatically reseat itself in the event it is "blown off" due to a transient pressure condition within the pump housing 11.

Since the chamber in the seal casing is communicated with the atmosphere, cooling of the seal cannot be effected by circulating the leakage fluid past the shaft seal to the pump inlet, as in the preceding embodiment. In order to effect cooling of this shaft seal, in the embodiment of Figs. 5–8, the outer stationary seal member 124 is provided with an annular groove 145 which registers with the groove 132 in the rotary seal member. The groove 145 is communicated by passages 146 and 147 in the stationary seal member, and through passages 148 and 149 in the seal casing 102 and pump housing 11, respectively, to the fluid pressure chamber 150 within the housing 11 in which the fluid is under the aforementioned intermediate pressure. A circulation of the fluid from the chamber 150 is produced by the centrifugal pumping action effected by the passage 143, the latter drawing fluid from adjacent the inner seal face 129 and discharging the fluid at the groove 132 from whence it flows through groove 145, passages 146—149 back to the chamber 150. This circulation of the fluid effects cooling of the rotary and stationary seal members and permits operation at high speeds and pressures. An O-ring 151 is disposed around the passage 147 to seal the interface between the stationary seal member 124 and the seal casing 102 and prevent leakage from the recirculating passage.

From the foregoing it is apparent that the subassembly of the drive shaft and rotary seal member are hydraulically balanced so that there is substantially no resultant end thrust, due to hydraulic pressure, which acts between a rotating member and a stationary member to produce wear. However, if desired, the areas on the rotary seal member may be so proportioned as to provide a small residual pressure unbalance in a direction to urge the rotary seal member against the fixed seal member and the floating seal member similarly unbalanced to assure a positive seal. Moreover, since the rotary seal member is supported on the ball member for free floating movement, the rotary seal member is free to align its seal faces with those of the stationary seal members, thereby permitting the drive shaft to operate through considerable misalignment between the driven element 13 and the drive pad which is connected to the externally splined end 20 of the drive shaft. In each of the embodiments of the shaft seal, one of the stationary seal members is fixed and the rotary seal member swivels about the ball member to align its face with the fixed seal member. The other seal member is floatingly supported on the seal casing to align itself with the other seal face on the rotary member, the floatingly supported seal member being yieldably urged by a spring into sealing engagement with the rotary seal member and the latter urged thereby into sealing engagement with the fixed seal member. Although the inner seal member in Figs. 1–4, and the outer seal member in Figs. 5–8, is shown fixedly mounted, it is apparent that proper operation of the shaft seal is not dependent on which of the stationary or non-rotatable seal members is floatingly supported so long as some relative movement between the stationary seals is provided to assure engagement of the stationary seal members with opposed seal faces on the rotary seal member.

Provision is also made for cooling the shaft seal to permit high speed operation. In the embodiment of Figs. 1–4, this is achieved by recirculating, back to the inlet, a portion of the fluid around the rotary seal. In the embodiment of Figs. 5–8, the rotary seal having passage 143 therein is arranged for operation as a centrifugal pump to effect circulation of the fluid past the seal. In addition, the last mentioned shaft seal is arranged so that in the event of a "blow-off" of the rotary seal from the stationary seal, the hydraulically balanced drive shaft and rotary seal member are hydraulically unbalanced in a direction to urge the rotary seal back into sealing engagement with the stationary seal.

I claim:

1. In an hydraulic apparatus including a housing, a shaft extending into said housing and having the inner end thereof exposed to fluid pressure within said housing and the outer end thereof exposed to fluid pressure externally of the housing, a shaft seal for sealing the interface between said housing and said shaft comprising inner and outer axially spaced seal members mounted on said housing and having aligned passages for the reception of said shaft, a rotary seal member disposed on said shaft between said spaced seal members and having seal faces at the inner and outer sides thereof respectively engaging said inner and outer seal members, means connecting the rotary seal member to the shaft to apply the end thrust on the shaft due to the pressure unbalance on opposite ends of the shaft to the rotary seal member, a first passage means for applying fluid under pressure from within said housing to an area on the outer side of the rotary seal member, and a second passage means for applying the fluid under pressure from externally of the housing to an area on the inner side of the rotary seal member.

2. In an hydraulic apparatus including a housing, a shaft extending into said housing and having the inner end exposed to fluid pressure within the housing and the outer end exposed to fluid pressure externally of the housing, a shaft seal for sealing the interface between the shaft and housing comprising first and second axially spaced stationary seal members, a rotary seal member disposed on said shaft between said stationary seal members and having a first annular seal face engaging said first seal member and a second annular seal face engaging said second seal member, one of said seal faces being disposed radially inwardly of the outer periphery of the other of said seal faces to provide a first pressure area on one side of the rotary seal member, said second stationary seal member and the other of said seal faces having an annular groove formed in one of the abutting surfaces thereof intermediate the inner and outer edges of said other seal face and providing a second pressure area on the other side of the rotary seal member, means connecting the rotary seal member to the shaft to apply the end thrust on the shaft due to hydraulic pressure acting on the inner end thereof to the rotary seal member, a first passage means for applying fluid under pressure from said apparatus to one of said pressure areas on the rotary seal member, and a second passage means for applying fluid under pressure from externally of the housing to the other of said pressure areas on the rotary seal member.

3. In an hydraulic apparatus including a housing, a shaft extending into said housing and having the inner end exposed to fluid pressure within the housing and the outer end exposed to fluid pressure externally of the housing, a shaft seal for sealing the interface between the shaft and housing comprising a first stationary seal member and a second stationary seal member, a rotary seal member disposed on said shaft between said stationary seal members and having a first annular seal face engaging said first seal member and a second annular seal face engaging said second seal member, one of said seal faces being disposed radially inwardly of the outer periphery of the other of said seal faces and providing a first pressure area at one side of the rotary seal member, the other of said seal faces having an annular groove therein providing a second pressure area at the other side of the rotary seal member, means interposed between the rotary seal member and the shaft for floatingly supporting the rotary seal member on the shaft, means on said shaft for applying the end thrust on the shaft due to the hydraulic pressure on the inner end thereof to the rotary seal member, a first passage means for applying fluid under pressure from within said apparatus to one of said pressure areas on said rotary seal member to oppose the thrust applied to the rotary seal member by said shaft, and a second passage means for applying fluid under pressure from externally of the housing to the other of said pressure areas on the rotary seal member.

4. In an hydraulic apparatus including a housing, a shaft extending into said housing and having the inner end exposed to fluid pressure within the housing, a shaft seal for sealing the interface between the shaft and housing comprising an inner stationary seal member and an outer stationary seal member disposed on the side of said inner member remote from the inner end of the shaft, a rotary seal member disposed on said shaft between said stationary seal members and having an annular inner seal face engaging said inner member and an annular outer seal face engaging said outer member, said rotary seal member having an axially disposed semi-spherical seat formed thereon, a complementary semi-spherical ball member on said shaft engageable with said seat for applying the end thrust on the shaft due to the hydraulic pressure on the inner end thereof to the rotary seal member and for floatingly supporting the rotary seal member on the shaft, a first passage means for applying fluid under pressure from within said apparatus to an area on the outer side of said rotary seal member to oppose the thrust applied to the rotary seal member by said shaft, and a second passage means for applying fluid under pressure from externally of said housing to an area on the inner side of said rotary seal member.

5. In an hydraulic apparatus including a housing, a shaft extending into said housing and having the inner end thereof exposed to the fluid pressure therein, a shaft seal for sealing the interface between said shaft and housing comprising inner and outer stationary seal members, means slidably and non-rotatably mounting said outer seal member on said housing on the side of said inner seal member remote from the inner end of the shaft, a rotary seal member disposed on said shaft between said stationary seal members and having an annular inner seal face engaging said inner stationary seal and an annular outer seal face engaging said outer seal member and disposed radially inwardly from the outer periphery of the inner seal face, said inner seal face having an annular groove formed therein, passage means in said rotary seal member communicating said groove with the atmosphere external of the housing, means for applying fluid under pressure from said apparatus to said rotary seal member between said stationary seal members, said rotary seal member being constructed and arranged so that the resultant hydraulic thrust on the sub-assembly of said shaft and rotary seal member is substantially zero, and spring means yieldably urging said outer seal member towards said inner seal member.

6. A shaft seal assembly adapted to be mounted on an hydraulic apparatus with the inner end thereof in communication with the pressurized fluid against which the seal is to operate, said seal assembly comprising an annular seal housing, an inner stationary seal member mounted at the inner end of said seal housing, an outer stationary seal member, means floatingly mounting said outer seal member on the outer end of said seal housing in fluid sealing relation therewith, a drive shaft extending from the outer end through the inner end of said seal housing, a rotary seal member floatingly supported on said shaft between said stationary seal members and having an annular inner seal face engaging said inner stationary seal member and an annular outer face engaging said outer stationary seal member, means connecting the shaft to the rotary seal member to apply the end thrust on the shaft due to the fluid pressure acting on the inner end thereof to the rotary seal member, and passage means in said housing for applying the pressurized fluid from the apparatus to said rotary seal member between said inner and outer stationary seal members, said outer seal face being disposed radially inwardly from the outer periphery of said inner seal face whereby the pressurized fluid acting thereon applies a thrust on said rotary seal member which opposes the thrust applied thereto by said shaft.

7. A shaft seal assembly adapted to be mounted on an hydraulic apparatus with the inner end thereof in communication with the pressurized fluid against which the seal is to operate, said seal assembly comprising an annular seal housing, an inner stationary seal member mounted at the inner end of said housing, an outer seal member having an integral sleeve thereon, a resilient O-ring carried by said seal housing and engaging said sleeve to floatingly support said outer seal member on the housing and seal the interface therebetween, a drive shaft extending through said housing, a rotary seal member floatingly supported on said shaft between said stationary seal members and having an annular outer seal face engaging said outer seal member and an annular inner seal face engaging said inner seal member, means connecting the shaft to the rotary seal member to apply end thrust on the shaft due to the fluid pressure acting on the inner end thereof to the rotary seal member, passage means in said housing for applying the pressurized fluid acting on the inner end of said seal to the chamber formed between said seal members and said housing, said outer seal face being disposed radially inwardly from the outer periphery of the inner seal face whereby the pressurized fluid in said seal housing applies a thrust on the rotary seal member which opposes the thrust applied thereto by said shaft, said O-ring engaging said sleeve at a point spaced radially inwardly from the outer periphery of the outer seal face and radially outwardly of the inner periphery of said outer seal face a distance such that the outer stationary seal member is hydraulically balanced, and spring means acting between the outer seal member and the housing yieldably urging said outer seal member against said rotary seal member.

8. In an hydraulic apparatus including a housing, a shaft extending into said housing and having the inner end thereof exposed to the fluid pressure therein, a shaft seal for sealing the interface between said shaft and housing comprising a rotary seal member mounted on said shaft and having an inner seal face and an outer seal face, inner and outer stationary seal members respectively abutting said inner and outer seal faces in running seal therewith, said inner seal face being disposed radially inwardly from said outer seal face to form a first pressure area on the rotary seal member, said outer seal face having an annular groove therein providing a second pressure area, first passage means in said rotary seal member for applying fluid under pressure from within the housing to said second pressure area in said groove, and a second passage means in said rotary seal member for applying fluid under pressure from externally of the housing to said first pressure area on the rotary seal member.

9. The combination of claim 8 wherein said first passage is arranged to produce a centrifugal pumping action, and passage means in said housing for recirculating the fluid pumped through said first passage as the rotary seal is rotated.

10. In an hydraulic apparatus including a housing, a shaft extending into said housing and having the inner end thereof exposed to fluid pressure within the housing and the outer end thereof exposed to fluid pressure externally of the housing, a shaft seal for sealing the interface between the housing and the shaft comprising inner and outer axially spaced seal members mounted on said housing and having aligned passages therein for the reception of said shaft, a rotary seal member disposed on said shaft between said spaced seal members and having seal faces at the inner and outer sides thereof respectively engaging said inner and outer seal members, said rotary seal member having an area on the inner side thereof exposed to the fluid pressure within said housing, means connecting the rotary seal member to said shaft to apply the end thrust on the shaft due to the pressure unbalance on opposite ends thereof to said rotary seal member, a first passage means for applying fluid under pressure from within said housing to an area on the outer side of said rotary seal member, a second passage means for applying fluid under pressure from externally of said housing to an area on the inner side of said rotary seal member, the radial area on the outer side of said rotary seal member, to which fluid under pressure from within said housing is applied, being greater than the radial area on the inner side of the rotary seal member which is exposed to fluid under pressure from within said housing whereby said rotary seal member is hydraulically unbalanced in a direction opposite the direction of hydraulic unbalance of said shaft.

11. In an hydraulic apparatus including a housing, a shaft extending into said housing and having the inner end thereof exposed to fluid under a preselected pressure condition within the housing, a shaft seal for sealing the interface between said housing and said shaft and including a stationary seal member mounted on said housing, a rotary seal member disposed on the shaft in engagement with the side of said stationary seal member remote from the inner end of said shaft, means connecting the rotary seal member to the shaft to apply the end thrust on the shaft due to the hydraulic pressure acting on the inner end thereof to said rotary seal member, passage means applying fluid under said preselected pressure condition from within said housing to an area on the inner side of said rotary seal member, and passage means for applying fluid under said preselected pressure conditions from within said housing to the side of said rotary seal member remote from the inner end of said shaft, the radial area on the outer side of said rotary seal member to which fluid under said preselected pressure condition from within said housing is applied being greater than the radial area on the inner side of the rotary seal member, to which fluid under said preselected condition from within said housing is applied, to thereby produce an hydraulic unbalance on the rotary seal member in a direction to oppose the thrust applied to the rotary seal member by said shaft.

12. In an hydraulic apparatus including a housing, a shaft extending into said housing and having the inner end thereof exposed to fluid pressure within the housing and the outer end thereof exposed to fluid pressure externally of the housing, a shaft seal for sealing the interface between the shaft and the housing comprising a rotary seal member attached to said shaft and having first and second seal faces on one end thereof and a third seal face on the other end thereof, inner and outer stationary seal members abutting said seal faces in a running seal therewith, a first passage means for applying fluid under pressure from within said housing to an area on the outer side of the rotary seal member, and a second passage means for applying fluid under pressure from externally of said housing to an area on the inner side of the rotary seal member.

13. In an hydraulic apparatus including a housing, a shaft, a shaft seal including a rotary seal member on said shaft and inner and outer stationary seal members disposed at the inner and outer sides of the rotary seal member, a pair of radially spaced seal faces on one side of the rotary seal member engaging one of the stationary seal members and defining first and second separate pressure areas on one side of the rotary member, a seal face on the other side of the rotary member spaced radially inwardly from the radially outer seal face on said one side of the seal member and engaging the other of the stationary seal members to define first and second separate pressure areas at said other side of the rotary member, means for applying fluid under pressure from within said housing to the inner end of the shaft and to said first pressure area on the inner side of the rotary member, means for applying the axial thrust on the shaft due to the pressure unbalance between the inner and outer ends of the shaft to the rotary seal member, means for applying fluid under pressure from within said housing to said first pressure area on the outer side of the rotary member, means for applying fluid under pressure from externally of said housing to said second pressure areas on the inner and outer sides of the rotary member and to the outer end of the shaft, the pressure differential between the first and second areas on each side of the rotary seal member producing a pressure gradient across each of the seal faces on the rotary member, the separate areas at the inner and outer sides of the shaft and rotary seal being related so that the respective pressures acting thereon produce an axial thrust on the outer side of the shaft and rotary member substantially equal to the axial thrust on the inner side of the shaft and rotary member.

14. The combination of claim 13 wherein the stationary member which engages the side of the rotary member having a single seal face is mounted on the housing for free axial float, and an annular seal ring sealing the interface between said last mentioned stationary member and the housing at a point intermediate the radially inner and outer edges of said last mentioned seal face.

References Cited in the file of this patent

UNITED STATES PATENTS

| | | |
|---|---|---|
| 1,315,822 | Doran | Sept. 8, 1919 |
| 1,457,584 | McCuen | June 5, 1923 |
| 1,927,543 | Doyle | Sept. 19, 1933 |
| 2,033,403 | Smittle | Mar. 10, 1936 |
| 2,299,395 | Karlberg | Oct. 20, 1942 |
| 2,470,419 | Voytech | May 17, 1949 |
| 2,479,265 | Roshong | Aug. 16, 1949 |
| 2,531,079 | Payne | Nov. 21, 1950 |